United States Patent Office 2,920,995
Patented Jan. 12, 1960

2,920,995
FUNGICIDES FOR CHLOROPHYLLACEOUS PLANTS

Earl P. Williams, Pen Argyl, Pa., and Raymond L. Mayhew, Phillipsburg, N.J., assignors to General Aniline & Film Corporation, New York, N.Y., a corporation of Delaware No Drawing. Application April 4, 1958
Serial No. 726,305

6 Claims. (Cl. 167—30)

This invention relates to the control and eradication of fungi attacking chlorophyllaceous plants.

There are various chemical compounds available for the control and eradication of fungi attacking various species of chlorophyllaceous plants. Many of these fungicidal compounds can be grouped into several classes, such as phenol derivatives of mercury, such as dithiocarbamates, organic derivatives of sulfur, such as tetramethyl-thiuram disulfide, metallic methyldithiocarbamates, chlorinated quinones and numerous others. Although a majority of the currently available fungicides are effective, they have two separate disadvantages. From the chemical point of view they are complex organic compounds requiring complicated methods in syntheses and are quite costly to produce. From the practical point of view, they must be applied in emulsified form. In other words, while many of the compounds are solids, they must be mixed with a carrier or an emulsifying agent which would permit their dispersion in aqueous media prior to application.

It is an object of the present invention to provide an economically inexpensive fungicide which does not require the use of carriers or emulsifiers for effective application.

Other objects and advantages will become more clearly manifest from the following description.

We have discovered that certain species of dinonylphenoxypolyethoxypropionitriles are effective fungicides that normally attack various species of chlorophyllaceous plants. These compounds are characterized by the following general formula:

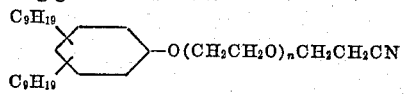

wherein $n$ represents a positive integer of from 5 to 10.

The fungicidal compounds characterized by the foregoing general formula are readily obtained by the cyanoethylation of the reaction product of dinonyl phenol and ethylene oxide. The first step is the condensation of 1 mole of dinonyl phenol with 5 to 10 moles of ethylene oxide in the usual manner as is well known to those skilled in the art. The resulting condensation product, 1 mole, is then condensed with 1 mole of acrylonitrile in the presence of an alkaline catalyst to form the corresponding cyanoethyl ether in yields of 90–95%. The basic catalyst must be either sodium or potassium hydroxide and is generally employed in amount of 0.5% based on the moles of the condensation product resulting from dinonyl phenol and ethylene oxide. A suitable method for preparing such compounds is found in U.S. Patent 2,280,792. The following procedure however, gives best results for the preparation of the fungicidal compounds.

Example I

A 5 liter round bottom flask is first equipped with stirrer, thermometer and downward condenser to receiver equipped with vacuum take-off. To the flask is then added 5 moles of a condensation product obtained by condensing 1 mole of dinonyl phenol with 5 moles of ethylene oxide which had been previously treated with sulfuric acid to neutralize the sodium hydroxide employed as a catalyst during the condensation reaction. To the 5 moles of the condensation product is then added 0.025 mole of 3.43 N caustic soda and 15 ml. of technical isopropanol. The contents of the charged flask were then heated to 100° C. The pressure was then reduced to 20 mm. using a cold water aspirator while continuing the heating to 160° C. A total of 21 grams of distillate was collected in a Dry Ice acetone trap. The contents of the flask were then allowed to cool to 100° C. and the vacuum discharged. At this point 5.25 moles of acrylonitrile were added dropwise over a period of ¾ hour at 90–95° C. The external heating was then stopped and the reaction allowed to cool with continued stirring over a period of ¾ hour at 90–80° C. The reaction mixture was then neutralized with 50 ml. of 0.5 N sulfuric acid. The unreacted acrylonitrile and water were distilled off while heating to 120° C. at 30 mm. pressure. The final product was filtered in order to remove small amounts of salt while hot and employing a suction filter. The yield obtained amounted to 97.9%.

Example II

Example I was repeated with the exception that the dinonyl phenol-ethylene oxide condensate was replaced by 5 moles (3052.0 grams) of a condensate obtained by reacting 1 mole of dinonyl phenol with 6 moles of ethylene oxide. The yield obtained amounted to approximately 98%.

Example III

Example I was repeated with the exception that the dinonyl phenol-ethylene oxide condensate was replaced by 5 moles (3272.0 grams) of a condensate obtained by reacting 1 mole of dinonyl phenol with 7 moles of ethylene oxide. The yield obtained amounted to approximately 98%.

Example IV

Example I was repeated with the exception that the dinonyl phenol-ethylene oxide condensate was replaced by 5 moles (3492.0 grams) of a condensate obtained by reacting 1 mole of dinonyl phenol with 8 moles of ethylene oxide. The yield obtained amounted to approximately 98%.

Example V

Example I was repeated with the exception that the dinonyl phenol-ethylene oxide condensate was replaced by 5 moles (3712.0 grams) of a condensate obtained by reacting 1 mole of dinonly phenol with 9 moles of ethylene oxide. The yield obtained amounted to approximately 98%.

Example VI

Example I was repeated with the exception that the dinonyl phenol-ethylene oxide condensate was replaced by 5 moles (3932.0 grams) of a condensate obtained by reacting 1 mole of dinonyl phenol with 10 moles of ethylene oxide. The yield obtained amounted to approximately 98%.

Example VII

For purposes of comparison, a compound having the following formula was prepared in the conventional manner.

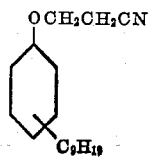

Example VIII

For purposes of comparison nonylphenoxypolyethoxypropionitrile wherein the mole ratio of ethylene oxide was 1.5 has the following formula, was also prepared in the conventional manner:

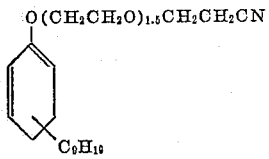

As noted above, the unusual feature of the compounds prepared in accordance with Examples I to VI inclusive, is that they are water soluble and do not require any carriers or emulsifiers to bring about their effective utilization as fungicides. Aqueous solutions thereof have a tendency to adhere to leaves and stems, including infuorescence, and form a thin film containing the toxic ingredient. With repeated rain or spray hosing the film is readily dissolved after its fungicidal action has taken place. Aqueous solutions containing from 100 to 1000 parts per million of the products of Examples I to VI inclusive, are very efficient in the control and eradication of various species of fungi which normally attack and injure chlorophyllaceous plants grown in fields, home gardens and greenhouses. They are particularly effective in the control and eradication of fungi that attack underground parts such as root rot caused by fungi (Pythium, Rhizoctonia), wilt caused by fungi (Fusarium, Verticillium), and the like. These and many other species of fungi are effectively controlled by spraying either the soil or the plant with aqueous solution of the fungicidal agent.

Instead of aqueous solutions, the fungicidal agents employed in accordance with the present invention may also be applied with the customary carriers or emulsified if desired or mixed with talc, exploded mica, bentonite, kieselguhr, chalk, clay or any of the currently used carriers. Regardless of method of application, the fungicidal activity is neither diminished nor impaired. The quantity of the carrier, whether liquid or solid, which is added to the fungicidal agent can be varied between wide limits depending upon the strength of the active fungicide desired in the final composition. The carrier therefore may comprise between 5 and 90% of the ultimate composition.

In addition to being effective against fungi that attack underground parts of chlorophyllaceous plants, the fungicidal compositions of the present invention may be applied to plants themselves, that is foliage, stems, etc. The fungicidal compositions are very specific for controlling powdery mildews of rose, peach, apple and chrysanthemums. They aid in the control of the most serious disease of roses, to wit, the blackspot (*Diplocarpon rosae*), common leaf rust of roses, brown canker (*Cryplosporella umbrina*), azalea flower spot and the like.

The following examples will show how the fungicidal compounds of the present invention may be utilized in the control and eradication of destructive fungi.

Example I

In this example, the late blight fungus (*Phytophthora infestous*) was used as the test organism. The fungus was reared on sterile wheat seeds in a flask kept at room temperature. The cultured fungus was transferred 10 days prior to testing. A slurry was made of the mycelia and broken up by means of a Waring blender before application to the test plates.

Duplicate tomato plants, Bonny Best variety, 4-5 inches high were placed on a rotating turntable and sprayed with the candidate test chemical formulated in water, acetone and a small amount of surfactant obtained by condensing 1 mole of dinonyl phenol with 15 moles of ethylene oxide. 100 to 110 mls. of solution were applied to the pair of plants using a DeVilbis spray gun with air pressure set at 40 pounds. Application of this spray took 30 seconds and the foliage was wetted to run off. The test solution was formulated to contain 1000 p.p.m. 6 plants were sprayed with the formulation without test chemical and held as checks. An additional 6 plants were sprayed with a standard Captan (N-trichloromethylthiotetrahydrophthalimide) and are held for comparison standards. As soon as the spray had dried the plants were inoculated by again placing them on the turntable and spraying with the mycelial brei for 30 seconds.

Following inoculation the plants were incubated for 48 hours at 72° F. and at 100% relative humidity. The plants were then removed from the incubator chamber and placed in a shade house of the greenhouse for an additional 48 hours.

The total number of lesions per 11 15x magnification fields on 11 leaflets of the three top leaves of each plant were counted. A similar count was made on the checkplants and on the plants treated with the standard. The average number of lesions per plant is calculated. Control is rated according to the following designations:

$A$=no control
$B$=no more than 25 lesions per plant
$C$=15–24 lesions per plant
$D$=6–14 lesions per plant
$E$=0–5 lesions per plant The results of the above test (100 p.p.m.) with the compounds of Examples I to VIII inclusive, are as follows:

| Test Compound | Rating |
| --- | --- |
| Blank | A |
| Captan | E |
| Product of Example: | |
| I | D |
| II | D |
| III | D |
| IV | D |
| V | D |
| VI | D |
| VII | C |
| VIII | A |

Example II 10 potted snapdragon plants, each one infected with the snapdragon rust were utilized in the eradication of the powdery chocolate-brown spore postules on the undersides of the leaves. 1 potted plant was used as the control; another was sprayed with 0.1% aqueous dispersion of Captan as a standard and the remaining pots were sprayed with 0.1% aqueous solution of the compounds of Examples I to VIII inclusive. After spraying, all of the potted plants were placed in a greenhouse for 48 hours at a temperature of 72° F. and 100% relative humidity. After 24 hours, the potted plants were examined with the following results:

| Pot No. | Test Compound | Appearance |
| --- | --- | --- |
| 1 | Blank | Original spores present with a yellowing of the upper surface. |
| 2 | Captan | No spores. |
| 3 | Product of Example I | Do. |
| 4 | Product of Example II | Do. |
| 5 | Product of Example III | Do. |
| 6 | Product of Example IV | Do. |
| 7 | Product of Example V | Do. |
| 8 | Product of Example VI | Do. |
| 9 | Product of Example VII | Original spores present. |
| 10 | Product of Example VIII | Do. |

We claim:
1. The process of controlling fungi attacking chlorophyllaceous plants which comprises applying to said plants a fungicidal amount of dinonylphenoxypolyethoxypropionitrile having the following general formula:

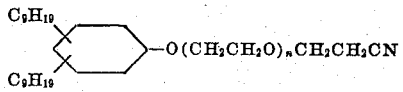

wherein $n$ represents a positive integer of from 5 to 10.

2. The process according to claim 1 wherein the $n$ of the general formula is 5.

3. The process according to claim 1 wherein the $n$ of the general formula is 6.

4. The process according to claim 1 wherein the $n$ of the general formula is 7.

5. The process according to claim 1 wherein the $n$ of the general formula is 8.

6. The process according to claim 1 wherein the $n$ of the general formula is 9.

References Cited in the file of this patent
UNITED STATES PATENTS
2,218,020    Coleman _____ Oct. 15, 1940